UNITED STATES PATENT OFFICE.

HERMAN HEUSER, OF CHICAGO, ILLINOIS.

PROCESS OF MANUFACTURING UNFERMENTED BEVERAGES.

1,204,869.     Specification of Letters Patent.     Patented Nov. 14, 1916.

No Drawing.     Application filed June 12, 1916. Serial No. 103,104.

*To all whom it may concern:*

Be it known that I, HERMAN HEUSER, a citizen of the United States, residing at Chicago, in the county of Cook and State of Illinois, have invented a certain new and useful Process of Manufacturing Unfermented Beverages, of which the following is a specification.

My invention relates to a new and useful process for the manufacture of unfermented beverages made without malt from grain materials such as bran, gluten or spent grains. Although figuring as industrial by-products, these materials are exceptionally rich in protein, their protein content being at times as high as double the amount of protein contained in the original grain. Unlike malt these materials do not contain the proteolytic enzyms necessary to convert their protein content into soluble modifications to form constituents of beverages. Neither do these materials contain any diastase or a sufficient quantity of the same to convert their starchy content into the soluble carbohydrates, dextrin and maltose, their amylaceous property being either *nil* or too small to be employed for such purpose. Thus while the characteristic feature of malt lies in its enzymatic properties derived from its content of peptase and diastase, these grain materials are characterized by an exceptionally high content of protein.

In consideration of the importance of protein for human nutriment it is desirable that the protein of such by-products be made available by changing it into modifications to form constituents of beverages for human consumption. With this in view, the present invention provides a new and useful process for the dissolution or liquefaction of protein by the proteolytic action derived from the treatment of the above materials with lactic acid bacteria, which process can be used, for example, in the manufacture of unfermented beverages on the order of soft drinks otherwise void of protein matter.

In the prior utilization of lactic acid bacteria for the liquefaction of protein high temperatures have been employed; thus according to Luhmann in his work entitled "*Industry of Alcohol Free Beverages of 1905*" the action of the lactic acid bacteria takes place at the high temperatures of 45° to 50°. Celsius. But the employment of a high temperature for the liquefaction of protein by lactic acid bacteria is not conducive to the production of flavor as required in beverages. On the other hand the present invention uses low temperatures and lactic acid bacteria acclimated to these temperatures, not only to enhance the protein liquefying property of the bacteria producing a larger amount of protein modifications of strongly foam-producing property in beverages, but also, and this is important in the manufacture of beverages, to impart a pleasant and desirable flavor to the beverage.

While in the prior manufacture of temperance beverages the treatment with lactic acid bacteria is confined to liquids, such as worts, the present invention utilizes a thick fluid grain mixture, made of bran, gluten or spent grains, containing per given volume a greater quantity of bacterial food, mineral as well as vegetable, and allowing more access of air to the bacteria than is the case with worts or liquids; and also such thick-fluid mixture promotes the action of the lactic acid bacteria.

In practising the present invention the bacteria employed are identical with the lactic acid bacteria isolated as pure cultures by Van Laer and Henneberg, they belong to the variety of *Saccharobacillus Pastorianus*. They produce lactic acid from saccharose, dextrose, levulose, dextrin, maltose, galactose and arabinose, but besides lactic acid small quantities of alcohol as well as traces of acetic and formic acid are formed. A crop of lactic acid bacteria belonging to this class is added to a concentrated mixture made with water and one of the above grain materials. The mixture is preferably so thick that it does not separate in a sediment of grains and a liquid cover excluding the air. Burton salt at the ratio of two ounces per barrel has been previously added to the water when the water is deficient in mineral substances to provide a sufficient quantity of mineral food for the bacteria. The mixture of water and grain is preferably kept at a temperature of 30° to 35° C. As container of the mixture a wooden vat of large diameter is preferred, which is preferably located in an inclosure or small room kept at 30° to 35° C. by means of mechanical heat regulation. The mixture is stirred to distribute the bacteria growing and working best in the surface layer of the mixture with plenty of air. The range of tempertures for the mixture containing the lactic acid bacteria lies between 20° C. and 40° C., preferably between the temperatures of 30° and 35° C. when the greatest amount of lactic acid is formed.

While the mixture may be made in the volume to be treated at any given time, I prefer to make an initial small mixture, comprising in volume say ten barrels of water and grain, to be used as a starting medium for the larger mixture ultimately employed. When in the initial or starting mixture the acidity from the action of the lactic acid bacteria has reached about 0.40%, another grain mixture is prepared of like high concentration and temperature, but amounting in volume to say 100 barrels or whatever volume it is desired to treat. The water for such mixture receives two ounces of Burton salt per barrel. The starting mixture is added under proper stirring and the joined mixture is kept at 30° to 35° C. in a container of the aforesaid type, stirring taking place for the equal distribution of the bacteria in the mass of grain and for the aeration of same to promote the bacterial action.

When the acidity of the mixture has reached the desired degree, say about 0.30%, the lactic acid treatment is completed, and a sufficient quantity of hot water is added to reduce the acidity to 0.20% and to raise the temperature of the mixture to 64° C. for the purpose of arresting any further bacterial action and for changing the last remnants of starch into soluble carbohydrates. The liquid may now be separated from the solid part of the mixture by filtration as through a filter press, or when convenient by sedimentation of the solids with subsequent draining of the liquid through the settled grains as filter material. The filtered liquid preferably receives an addition of corn sugar in solid or liquid form to produce the desired full-bodiness; to prevent undesirable sweetness by the addition of sugar, a grade of corn sugar containing a large amount of dextrin is preferably employed. At this stage the liquid may be cooled, then carbonated and clarified by filtration, and as such put upon the market.

When it is desired that the beverage shall have the flavor and taste of hops, in addition to the flavor and taste derived from the lactic acid treatment, it is necessary that the degree of acidity be low at the stage when the hopping takes place, because the hop resins imparting such taste and flavor are only slightly absorbed or not at all by the liquid when the same contains large quantities of lactic acid; the degree of absorption or dissolution of these resins decreases as the acid increases and vice versa. On the other hand a large degree of acidity is necessary to properly liquefy the protein. Therefore, it is necessary to reduce the acidity for the preparation of hopped beverages after the liquefaction of protein has taken place, and such reduction of the acidity of the liquid, preferably to 0.10%, is accomplished by neutralizing part of the lactic acid, preferably by binding it to potassium by the addition to the liquid of potassium carbonate in powdered form at a ratio of 0.40 pound per barrel, the addition to be made gradually to prevent excessive foaming by the too sudden escape of $CO_2$. Potassium lactate thus formed remains soluble in the liquid forming a valuable constituent of the same. After cooling to 3° C. or thereabout, the liquid is carbonated and thereupon filtered to perfect brilliancy, and when now poured into the glass has a sparkling appearance with a head of creamy foam, and the flavor and taste of hops in addition to the taste and flavor derived from the lactic acid treatment. The beverage so obtained possesses a light amber color; however, if consumers prefer beverages of a richer color it may be obtained by adding sugar coloring to the liquid during the stage of hopping; such addition to be small if the desired shade of color is to be of the ginger ale variety, but to be large if the same is to be intense like the color of coca-cola.

Where the grain material has been exposed to high temperature, preferably in wet or moist condition, as is the case with spent grains, it does not need any preparatory treatment with respect to its starchy content, before it is used in the present process, and the starch will be hydrolyzed to dextrin and dextrose during the process itself by the action of the lactic acid, and the introduction of the final high temperature after liquefaction in this process makes the conversion of the starch complete. But where the grain material has not been subjected to any previous heating, as is the case with bran and gluten, the gelatinization of the starch is effected by any suitable treatment before the present process commences. The mass contains enough soluble carbohydrates for the lactic acid bacteria to commence the acidification and liquefy the protein.

From the foregoing considerations as to the nature of the present invention and the principles to be observed to properly carry out the invention in practice, it is clear that the process is employed in the manufacture of unfermented beverages made without malt.

I claim:—

1. The process of liquefaction of protein into soluble modifications to form constituents of beverages which consists in proteolyzing protein by lactic-acid bacteria at a temperature between 20° and 40° Celsius.

2. The process which consists in mixing to thick-fluidity water and grain material containing protein, and liquefying the protein by lactic-acid bacteria at a temperature between 20° and 40° Celsius in the presence of air.

3. The process of manufacturing unfermented beverages which consists in providing a thick-fluid grain mixture containing protein, liquefying the protein by lactic-acid bacteria at a temperature between 20° and 40° Celsius, partly reducing the lactic acid acidity, and separating the liquid.

4. The process of manufacturing unfermented beverages which consists in providing a thick-fluid grain mixture containing protein, liquefying the protein by lactic-acid bacteria at a temperature between 20° and 40° Celsius, partly reducing the lactic acid acidity, and separating and hopping the liquid.

5. The process which consists in mixing to thick-fluidity water and grain material containing protein, liquefying the protein by lactic-acid bacteria at a temperature between 20° and 40° Celsius in the presence of air, and adding hot water to destroy the lactic-acid bacteria.

In testimony whereof I affix my signature in presence of two witnesses.

HERMAN HEUSER.

Witnesses:
J. McRoberts,
Edith Wilcox.